(12) United States Patent
Sakai et al.

(10) Patent No.: US 7,711,178 B2
(45) Date of Patent: May 4, 2010

(54) PATTERN INSPECTION METHOD AND ITS APPARATUS

(75) Inventors: Kaoru Sakai, Yokohama (JP); Shunji Maeda, Yokohama (JP); Takafumi Okabe, Yokohama (JP); Hiroshi Goto, Ushiku (JP); Masayuki Kuwabara, Machida (JP); Naoya Takeuchi, Tokyo (JP)

(73) Assignees: Hitachi, Ltd. (JP); Hitachi High-Technologies Corporation (JP)

( * ) Notice: Subject to any disclaimer, the term of this patent is extended or adjusted under 35 U.S.C. 154(b) by 0 days.

(21) Appl. No.: 11/869,217

(22) Filed: Oct. 9, 2007

(65) Prior Publication Data

US 2008/0031511 A1 Feb. 7, 2008

Related U.S. Application Data

(62) Division of application No. 10/353,946, filed on Jan. 30, 2003, now abandoned.

(30) Foreign Application Priority Data

Jan. 30, 2002 (JP) ............... 2002-022144

(51) Int. Cl.
*G06K 9/00* (2006.01)
(52) U.S. Cl. ..................... 382/151
(58) Field of Classification Search ............... 382/142, 382/151
See application file for complete search history.

(56) References Cited

U.S. PATENT DOCUMENTS

| 4,334,241 | A | 6/1982 | Kashioka et al. |
| 4,688,088 | A | 8/1987 | Hamazaki et al. |
| 5,067,162 | A | 11/1991 | Driscoll et al. |
| 5,781,657 | A * | 7/1998 | Masuda ............... 382/147 |
| 6,005,977 | A | 12/1999 | Tanimizu et al. |
| 6,301,376 | B1 | 10/2001 | Draganoff |
| 7,020,350 | B2 | 3/2006 | Sakai et al. |
| 7,127,126 | B2 | 10/2006 | Sakai et al. |
| 7,239,735 | B2 * | 7/2007 | Nozaki ............... 382/141 |
| 2001/0033683 | A1 * | 10/2001 | Tanaka et al. ............ 382/149 |
| 2001/0053245 | A1 | 12/2001 | Sakai et al. |
| 2002/0164077 | A1 * | 11/2002 | Lee et al. ............... 382/224 |
| 2005/0220333 | A1 | 10/2005 | Sakai et al. |

FOREIGN PATENT DOCUMENTS

| JP | 05-264467 | 10/1993 |
| JP | 2001-22935 | 1/2001 |
| JP | 2001-357382 | 12/2001 |

* cited by examiner

*Primary Examiner*—Bhavesh M Mehta
*Assistant Examiner*—Hadi Akhavannik
(74) *Attorney, Agent, or Firm*—Antonelli, Terry, Stout & Kraus, LLP.

(57) ABSTRACT

A pattern inspection method including: sequentially imaging plural chips formed on a substrate; selecting a pattern which is suitable for calculating position gap between an inspection image of a subject chip and reference image stored in memory from an image of a firstly imaged chip among said sequentially imaged plural chips formed on the substrate; computing position gap between an inspection image of a chip obtained by the sequential imaging and reference image stored in a memory by using a positional information of a pattern image included in the inspection image and a reference pattern image included in the reference image which are both corresponding to the pattern selected at the selecting; aligning the inspection image and the reference image by using information of the calculated position gap; and comparing the aligned inspection image with the reference image and extracting a difference as a defect candidate.

16 Claims, 15 Drawing Sheets

SCHEDULE

|  | FRAME1 | FRAME2 | FRAME3 | FRAME4 | FRAME5 | FRAME6 | FRAME7 | FRAME8 | FRAME9 |
|---|---|---|---|---|---|---|---|---|---|
| CHANNEL 7 |  | 1 |  | 1 |  |  |  |  |  |
| 6 |  |  | 1 |  | 1 |  |  | 1 |  |
| 5 |  |  |  |  |  | 1 |  |  |  |
| 4 |  |  |  |  |  | 1 |  | 1 |  |
| 3 | 1 |  | 1 |  | 1 |  |  |  |  |
| 2 | 1 | 1 |  | 1 |  |  |  |  |  |
| 1 |  |  |  |  |  |  |  |  |  |
| SEARCH RANGE | 3 | 3 | 3 | 3 | 3 | 3 |  | 3 |  |
| ORDER OF COMPUTATION | 1 | 2 | 3 | 4 | 5 | 6 | 7 | 8 | 9 |

FIG.20A
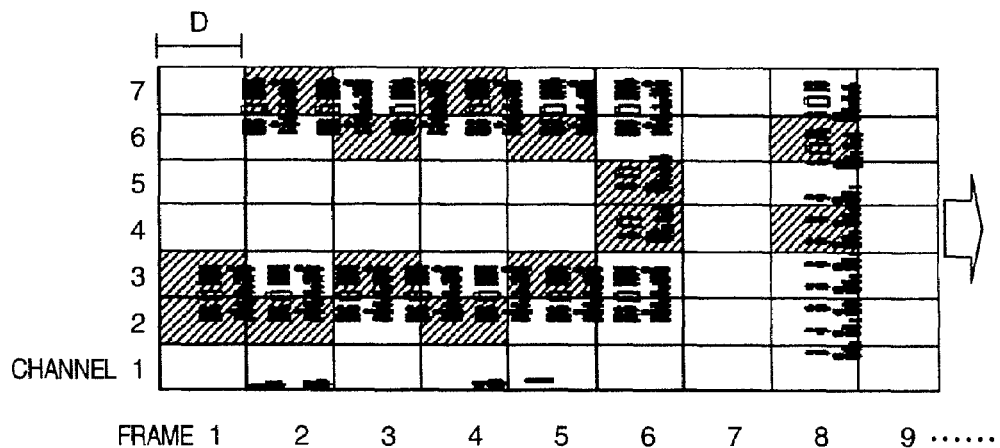
FIG.20B
SCHEDULE
| | FRAME1 | FRAME2 | FRAME3 | FRAME4 | FRAME5 | FRAME6 | FRAME7 | FRAME8 | FRAME9 |
|---|---|---|---|---|---|---|---|---|---|
| CHANNEL 7 | | 1 | | 1 | | | | | |
| 6 | | | 1 | | 1 | | | 1 | |
| 5 | | | | | | 1 | | | |
| 4 | | | | | | 1 | | 1 | |
| 3 | 1 | | 1 | | 1 | | | | |
| 2 | 1 | 1 | | 1 | | | | | |
| 1 | | | | | | | | | |
| SEARCH RANGE | 1 | 1 | 1 | 3 | 1 | 1 | | 3 | |
| ORDER OF COMPUTATION | 7 | 2 | 3 | 1 | 4 | 6 | 8 | 5 | 9 |
FIG.20C
PROCESSING OF EACH FRAME
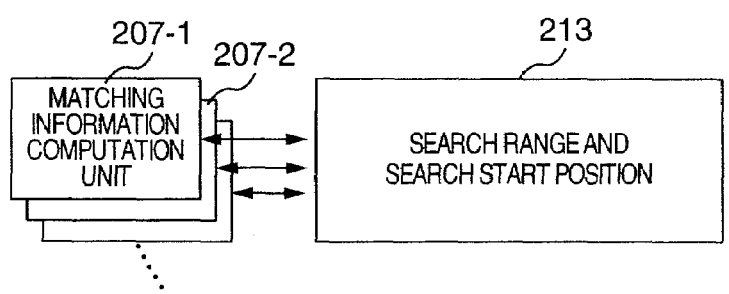

PATTERN INSPECTION METHOD AND ITS APPARATUS

CROSS REFERENCE TO RELATED APPLICATION

This is a divisional of U.S. application Ser. No. 10/353,946, filed Jan. 30, 2003 now abandoned. This application relates to and claims priority from Japanese Patent Application No. 2002-022144, filed on Jan. 30, 2002. The entirety of the contents and subject matter of all of the above is incorporated herein by reference.

BACKGROUND OF THE INVENTION

The present invention relates to a pattern inspection technique for checking patterns on objects to be inspected by comparing images.

The conventional pattern inspecting technique has been generally used such that, when an image to be inspected and a reference image are compared with each other in order for defects to be detected, the edges of the patterns of both images are aligned so that the minimum displacement between the edges can be computed as a piece of information for matching (alignment). The proposed means used for this purpose are normalized cross-correlation, and summation of residual errors.

Also, examples of the pattern inspection technique by comparing images are disclosed in JP-A-05-264467 and JP-A-2001-22935. The JP-A-05-264467 describes that an object to be inspected on which repeated patterns are regularly arranged is sequentially scanned by a line sensor, and each of the images picked up by the sensor and that image after being delayed by the pitch of the repeated patterns are compared to produce an amount of positional deviation, or displacement, and both successive imaged are aligned on the basis of the displacement to produce a difference, in which case if the difference is greater than a threshold, this object is decided to have a defect, while if it is smaller, the object is decided not to be defective.

The JP-A-2001-22935 describes that, in order that even an object to be inspected on which various patterns are formed mixed can be checked with the error due to mismatching being reduced, a candidate position for matching (alignment) is determined with respect to each of the images successively fed, and alignment is made after determining the optimum matching position of each image from the collection of a plurality of the matching candidate points.

When images of, for example, FIGS. 2A, 2B and 2C are checked, the conventional alignment-type inspection method described in JP-A-05-264467 cannot uniquely determine the matching position, and thus has the possibility of often causing computation error of displacement. FIG. 2A shows the case of extremely small edge information, or when the ratio of edge portion to the whole region for alignment (hereafter, referred to as pattern density) is small. FIG. 2B is the case when there are an extremely large number of edges in a particular direction, and FIG. 2C is the case when there are an extremely large number of small-pitch patterns.

Moreover, if other normal patterns exist as a small part in addition to many patterns like those shown in FIGS. 2A, 2B and 2C, has the possibility of causing nuisance defect (erroneously detected information) in that part. In addition, since matching candidate positions for images to be matched are calculated by using all regions, an enormous amount of data is used for the computation, thus taking a long processing time. For high speed, it is necessary to construct the Misalignment detection part as hardware or to increase the number of arithmetic circuits, thus making it difficult to reduce the cost and size of apparatus.

The technique described in JP-A-2001-22935 also uses a huge amount of data for the matching candidate points to be computed by using all regions, thus making it difficult to increase the processing speed, and hence to reduce the cost and size of apparatus as in the JP-A-05-264467.

Accordingly, it is an object of the invention when the images are compared for pattern inspection, to make it possible (1) to accurately detect particle and pattern defects, (2) to reduce the amount of computation for misalignment detector of images, thus increasing the processing speed, (3) to precisely detect the amount of displacement between images, and (4) to reduce the cost and size of apparatus.

SUMMARY OF THE INVENTION

According to the invention, to solve the above drawbacks, there is provided a pattern inspection method having the steps of dividing each of an inspected image corresponding to the region of an object to be inspected and a reference image of the corresponding reference region to be used for comparison into a plurality of image regions, computing information of displacement between the divided images of both images, computing the amount of displacement between the whole inspected image and the whole reference image by using the reliable displacement information, aligning both images on the basis of the computed amount of displacement, and comparing both images aligned with each other to detect the difference between them as particles or pattern defects.

In addition, the displacement-computed regions, the computation order and image search range are previously scheduled before the computation.

Thus, the pattern inspection technique can detect the displacement fast and precisely with simple computation. The particles and pattern defects can be detected with high sensitivity and with high speed. The inspection apparatus can be suppressed from being costly and large-sized.

These and other objects, features and advantages of the invention will be apparent from the following more particular description of embodiments of the invention, as illustrated in the accompanying drawings.

BRIEF DESCRIPTION OF THE DRAWINGS

FIGS. 20A-20C are diagrams useful for explaining the images that undergo the scheduling process and the results of the processing.

DESCRIPTION OF THE EMBODIMENTS

The present invention will be described in detail below.

FIGS. 1-21 are diagrams to which reference is made in explaining embodiments of the invention. In the embodiments, a semiconductor wafer is used as an object to be inspected.

Figure 1:
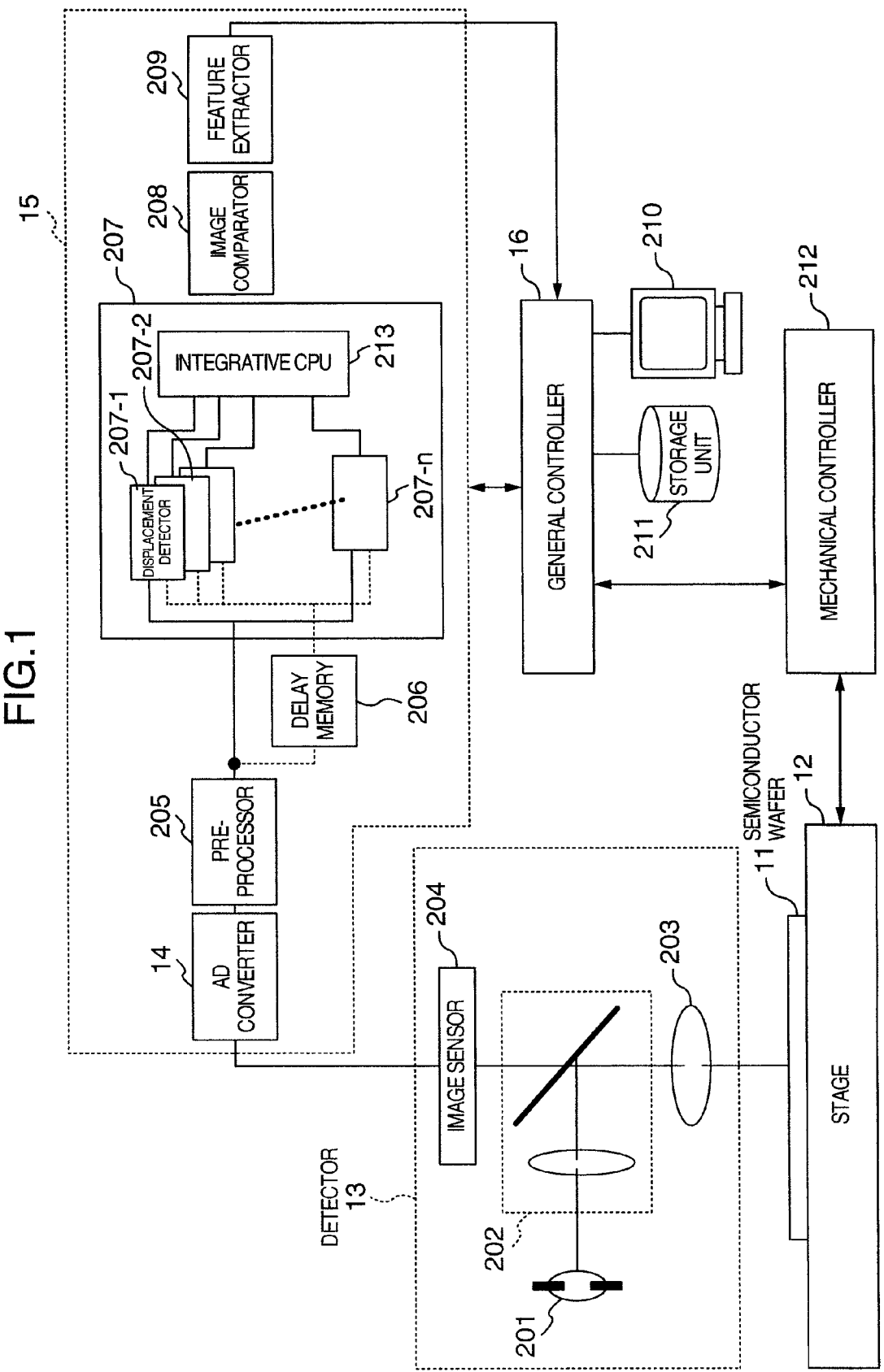
FIG. 1 is a block diagram showing the construction of an embodiment of a pattern inspection apparatus according to the invention.
Figure 2A:
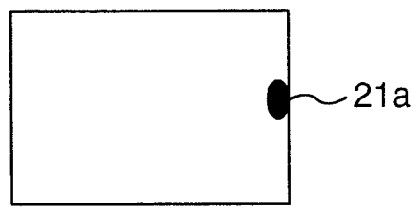
FIGS. 2A-2C are diagrams of examples of images unsuitable for detection of displacement.
Figure 2B:
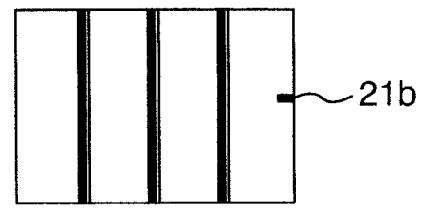
Figure 2C:
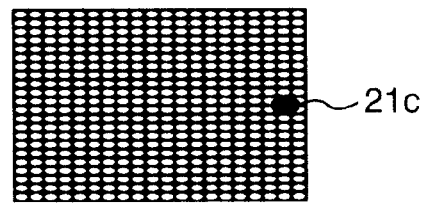

Referring to FIG. 1 that shows the inspection apparatus, there are shown a semiconductor wafer 11 as an object to be inspected, a stage 12 on which the semiconductor wafer 11 is set to move together with the stage, a light source 201 for irradiating light on the semiconductor wafer 11, an illuminating optical system 202 for converging the light emitted from the light source 201, an objective lens 203 that is used to illuminate the semiconductor wafer 11 with the light converged by the illuminating optical system 202, and to receive the light reflected from the wafer 11 to form an optical image, and an image sensor 204 that converts the formed optical image to an image signal in response to the brightness of the image and divides the image into a plurality of regions. These light source 201, illuminating optical system 202, objective lens 203 and image sensor 204 constitute a detector 13 for detecting an image to be detected and a reference image from the semiconductor wafer 11.

In addition, there are shown an AD converter 14 for converting the input signal from the detector 13 into a digital signal, and an image processor 15 that receives the image detected by the detector 13 to compute the foreign-particles attached regions and defective regions on the semiconductor wafer 11. There are also shown a pre-processor 205 that receives the digital signal to make correction of image such as shading correction and dark level correction, a delay memory 206 for storing as a reference image signal the digital signal of the chip to be used for comparison, a displacement detecting portion 207 for detecting the displacement between the digital signal detected by the detector 13 (image signal to be detected), and the reference image signal stored in the delay memory 206, and an image comparator 208 that compares the image signals of the detected image and the reference image by using the computed displacement, and produces an output signal as a defect when the difference is larger than a predetermined threshold.

Moreover, there is shown a features-extracting portion 209 that edits the output signal so that the smaller ones of the defect candidates can be eliminated as noise or that the neighboring defect candidates can be merged as one defect, and computes the value of features such as position, area and size of defect on the semiconductor wafer 11 to produce an output signal as pattern defect information or particle information. The displacement-detecting portion 207 includes arithmetic units 207-1, 207-2 . . . 207-n for computing information of the displacement in parallel from the images of n divided regions, and an integrative CPU 213 for computing the displacement of the whole image from a total of n displacements produced by the units 207-1, 207-2 . . . 207-n.

The image processor 15 includes the AD converter 14, the pre-processor 205, the delay memory 206, the displacement-detecting portion 207, the image comparator 208 and the features-extracting portion 209. Also, there are shown a general controller 16, a user interface 210 that has display means and input means for accepting the change of inspection parameter (such as the threshold used in the image comparison) ordered by the user and for displaying the detected defect information, and a storage unit 211 for storing the feature data and image data of the detected defect candidates. The general controller 16 has a CPU for various controls. Also, a mechanical controller 212 is shown that is responsive to a control command from the general controller 16 to drive the stage 12. The image processor 15 and the detector 13 are also driven by the command from the general controller 16.

Figure 3:
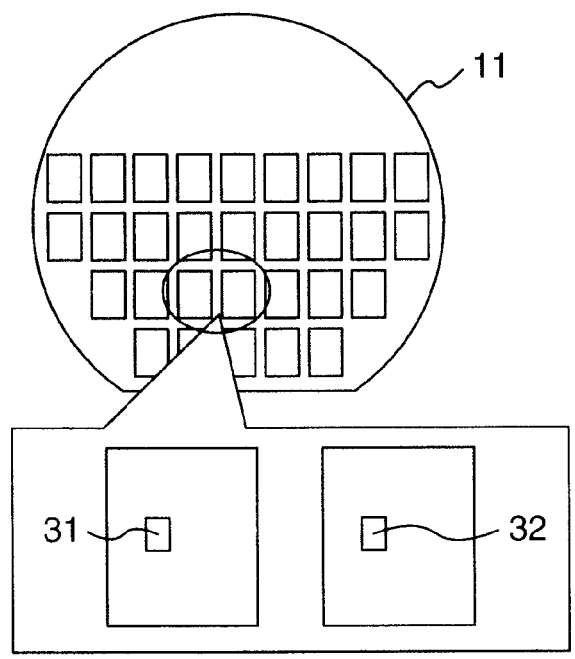
FIG. 3 is an example of semiconductor wafer as an object to be inspected.

FIG. 3 shows an example of the semiconductor wafer 11 as an object to be inspected. The semiconductor 11 has a large number of chips with the same shape or pattern arranged regularly.

The pattern inspection apparatus shown in FIG. 1 is operated as follows. The semiconductor wafer 11 is fixedly placed on the stage 12. Two images are respectively taken out of the regions (a reference region and a region to be inspected) located at the same position within each of two chips on the semiconductor wafer, that is, images (an image to be inspected and a reference image) are respectively picked up from, for example, a region 31 (reference region) and a region 32 (a region to be inspected) as shown in FIG. 3. Each of these images is divided into a plurality of small regions, and the displacement between certain corresponding regions of both images are computed after selecting those of the small regions of each of both images. Then, the overall displacement between both images, or between the image to be inspected and the reference image is obtained from the computed results. In addition, after both images are aligned in such a manner as to correct this displacement, the difference between both images is detected as a particle or defect by comparison.

The general controller 16 drives the stage 12 to continuously move the semiconductor wafer 11. The images of the chips are sequentially picked up by the detector 13 in synchronism with the movement of the wafer. The image processor 15 converts the analog signal into a digital signal by use of the AD converter 14, and makes shading correction, dark level correction and S/N improvement processing by the pre-processor 205. To the displacement detecting portion 207 are supplied an image signal of inspected chip (detected image signal) from the pre-processor 205, and an image signal from delay memory 206 delayed by a time during which the stage 12 is moved by the chip interval, that is, a set of an image signal of the chip now being inspected, and an image signal (reference image signal) of the chip just before the inspected chip.

The image signals of two chips sequentially fed in synchronism with the movement of the stage 12 cannot faithfully represent the signals at the same positions on the two chips if the stage 12 vibrates or if the semiconductor wafer 11 set on the stage 12 tilts. Therefore, the displacement-detecting portion 207 computes the displacement between two images sequentially fed. At this time, the detected image signal and reference image signal are continuously fed, but the computation of the displacement is made at each processing unit (frame) of a predetermined length in the direction in which the stage 12 moves.

Figure 4:
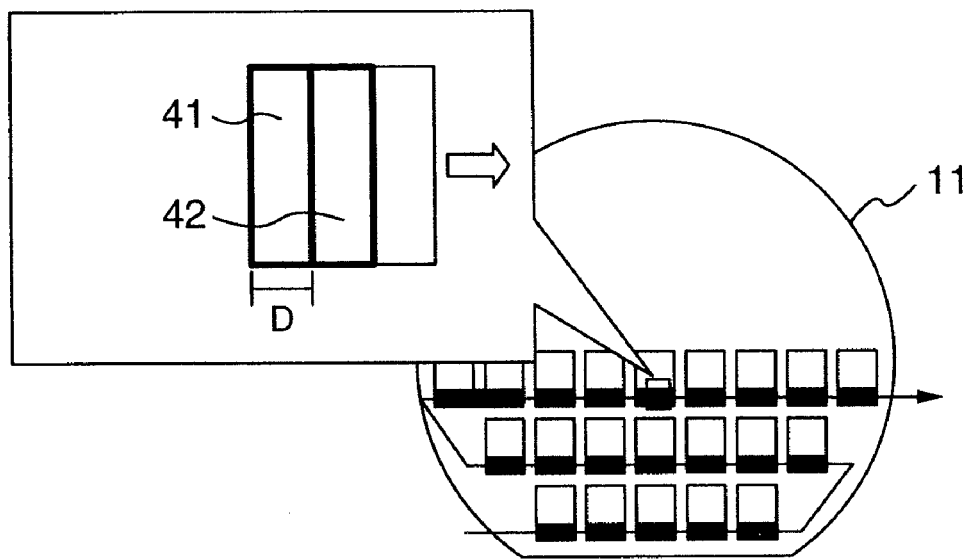
FIG. 4 is a diagram of an example of image units to be processed.

FIG. 4 shows an example of the processing unit (frame) to be processed as an image.

In FIG. 4, 41, 42, . . . represent a processing region of which the length, D (pixel) is one processing unit (hereafter, this processing region of one processing unit is called one frame). The displacement to the sequentially fed image is computed at each frame such that the displacement computation is made between the frame 41 of a chip and the corresponding frame of the adjacent chip at the position corresponding to that of the frame 41, and then between the frame 42 of the chip and the corresponding frame of the adjacent chip corresponding to the frame 42.

Figure 5:
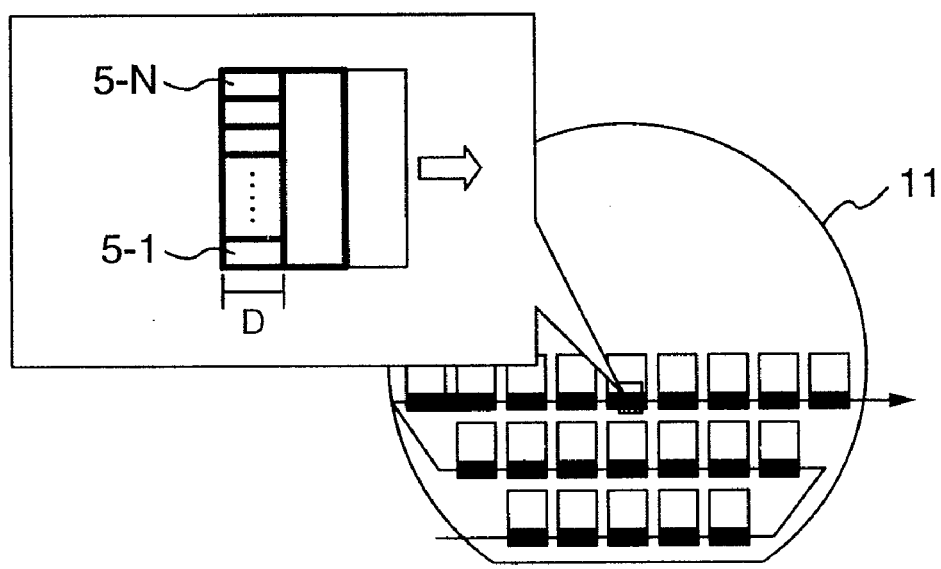
FIG. 5 is a diagram showing an example of divided images of the image unit to be processed.

FIG. 5 shows an example of small images into which each image of processing unit to be processed is divided, or an example of displacement computation of each processing unit by the displacement-detecting portion 207. The image sensor 204 of the detector 13 has a plurality of channels perpendicular to the movement direction of the stage 12 in order to divide each of the fed inspected image and reference image into N regions, and supplies them to the image processor 15. In FIG. 5, 5-1~5-N represent the small regions (divided regions). The displacement-detecting portion 207 (FIG. 1) makes parallel displacement computation of the N divided regions 5-1~5-N.

An example of the displacement computation method will be mentioned which is used by the arithmetic units 207-1, 207-2, . . . 207-n for making the parallel computation of displacement (simultaneous computation of displacement). The units 207-1, 207-2, . . . 207-n for the divided images are hereafter called channels. The displacement between the inspected image and the reference image is computed so that the displacement between the edges of images can be reduced to the minimum. As, for example, shown in FIG. 2, when the ratio of edges to the regions to be calculated for the displacement is small, that is, when the edge density is small or when there are an extremely large number of edges in a particular direction, or there are an extremely large number of repeated patterns of fine pitch, the displacement cannot be uniquely obtained by the conventional method in which the displacement is derived from the whole image information. Therefore, error will probably occur in the computation. In addition, if such image contains a normal pattern of other shape, nuisance defect (erroneous detection) due to displacement is likely to occur at that portion.

An example of the displacement computation error due to pattern will be described.

Figure 6:
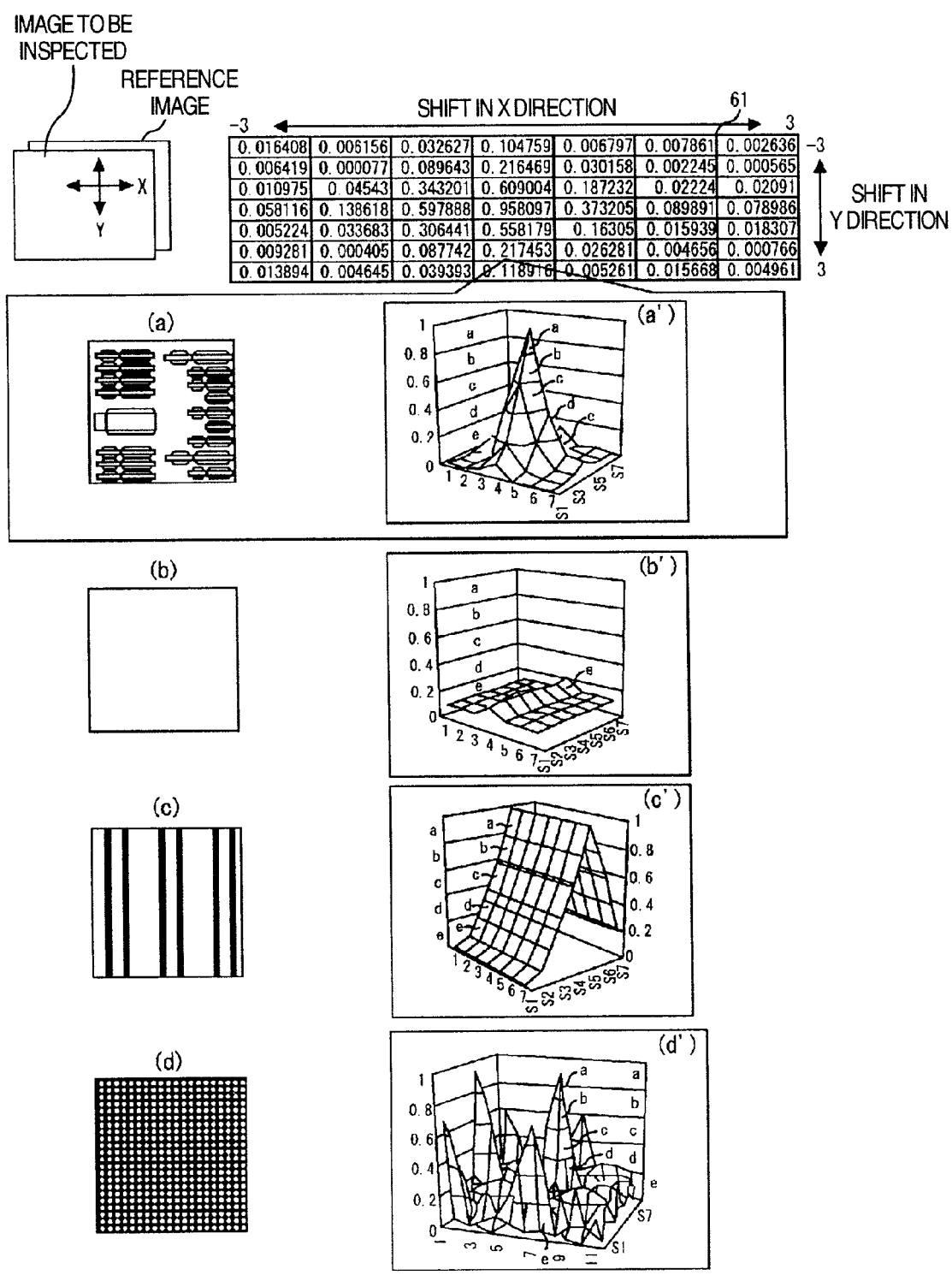
FIG. 6 is a diagram showing the relation between pattern shape and correlation map.
Figure 7A:
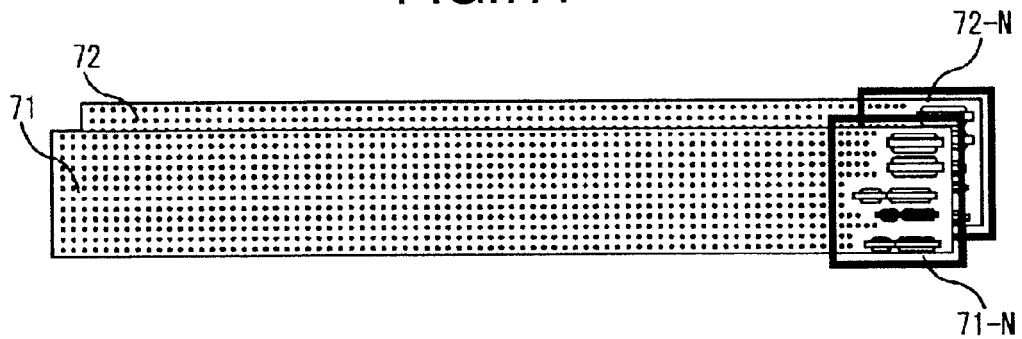
FIGS. 7A-7D are diagrams useful for explaining the effect of the invention.
Figure 7B:
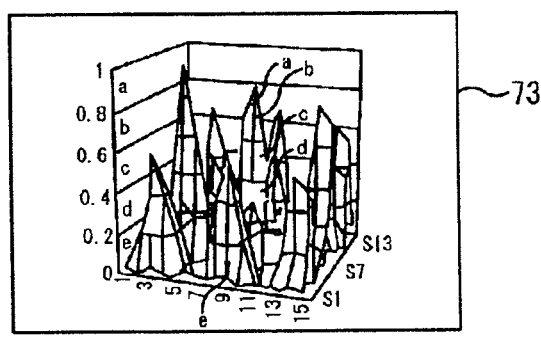
Figure 7C:
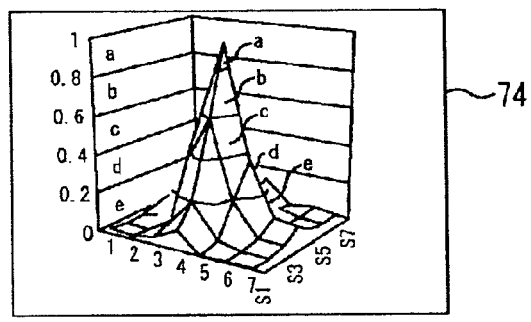
Figure 7D:
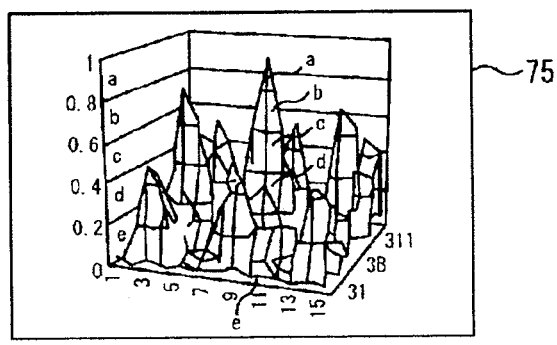

FIG. 6 shows the relation between pattern shape and correlation map. FIGS. 7A-7D are diagrams useful for explaining the effect of the invention. Although there are many methods for computing the displacement, we use the normalized mutual correlation for computing the displacement.

As shown in FIG. 6, two images on which we want to compute the amount of displacement are relatively shifted $-k \sim +k$ pixels in the X direction and $-1 \sim +1$ pixel in the Y direction, and the correlation values of the total number M ($M=((2 \times k+1)) \times ((2 \times 1+1)))$ of times that the two images are relatively shifted are calculated where k=1=3. Thus, a total of 49 correlation values 61 can be obtained according to the amounts of shifting the images (amount of shift) as shown in FIG. 6. The correlation values 61 arranged according to the amount of shift are hereafter called the correlation map. The amount of displacement between images equals the amount of shift at which the correlation value becomes the maximum within the correlation map 61. Since the correlation map 61 takes the maximum at the center (when the amount of shift is 0 in the X and Y directions), the amount of displacement between images is 0 pixel in either of the X and Y directions.

When the number of patterns is enough, or pattern density is high as in FIG. 6 at (a), the correlation map becomes as at 61. In FIG. 6, (a') is three-dimensional representation of the correlation map of pattern (a), and it has one peak of which the correlation value is large. However, when there is no pattern as at (b), the correlation map becomes (b') where the correlation map has no peak and small correlation values. When there are patterns only in a particular direction as at (c), the correlation map becomes like (c') which has a distribution of a ridge-like shape.

In addition, when patterns of dots are repeated at a fine pitch smaller than the image shift range as at (d), the correlation map becomes as at (d') where a plurality of high peaks are produced on the correlation map. Thus, for the patterns of (b), (c) and (d), the amount of displacement cannot be uniquely determined, and hence is difficult to find correctly. If the whole region to be inspected has similar patterns, no problem occurs, but if regular patterns are somewhat mixed with a number of the above patterns, nuisance defect (erroneous detection) due to the misalignment occurs in that portion.

In FIGS. 7A-7D, 71 and 72 represent a detected image and a reference image, respectively. Reference numeral 73 designates a correlation map computed from all the image regions of these images. In these images, since dot patters occupy most of the image regions, the correlation map 73 has a plurality of peaks where the correlation values have substantially equal heights. Therefore, erroneous detection is likely to occur. On the contrary, according to the invention, information 74 of the pattern having edge information in both X and Y directions like 71-N, 72-N are extracted by the following method to produce a correlation map of images 71 and 72 where there are correct peaks.

Figure 8:
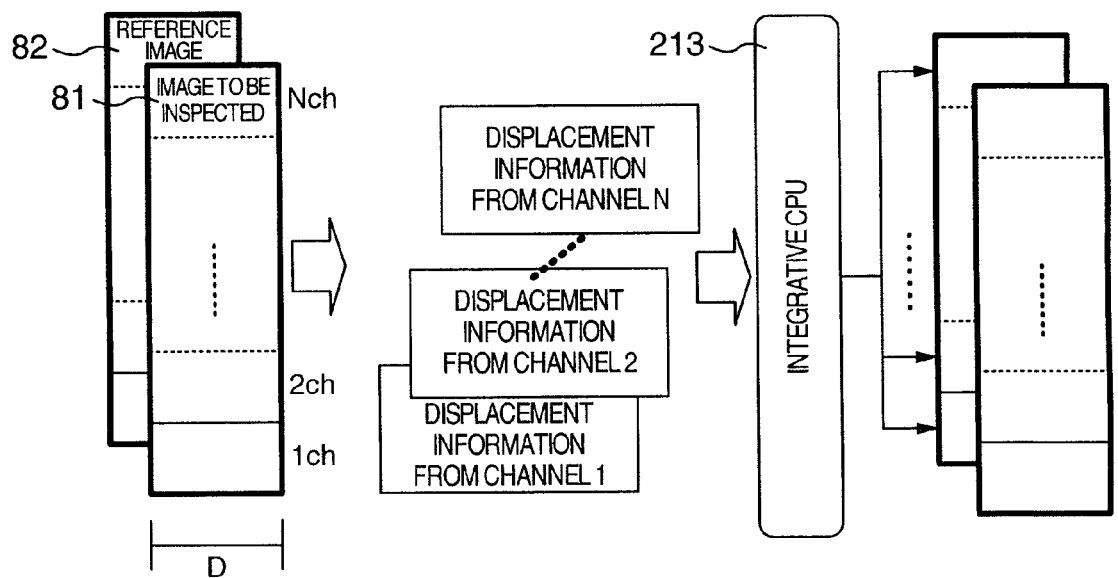
FIG. 8 is a diagram of an example of the displacement computing method according to the invention.

FIG. 8 shows a specific example of the method for computing the amount of displacement. In this method, basically, each of the image signal (inspected image) of the current chip fed from the detector 13 (see FIG. 1) and the image signal (reference image) of the previous chip fed through the delay memory 206 is divided into a plurality of (N) small images, and a correlation map is determined for each of these divided images, thus making it possible to extract the information 74 of the pattern having edges in the X and Y directions as seen on the right hand of the images 71 and 72 in FIG. 7. Specifically, as shown in FIG. 8, each of an inspected image 81 and a reference image 81 is divided into a plurality of small images, and these divided images are supplied to the channels, respectively. Each channel computes the above-mentioned correlation map 61 (see FIG. 6), and the position of the maximum correlation value is determined as the displacement within the channel.

The integrative CPU 213 (see FIG. 1) compiles these displacement computed by each channel, determines the displacement common to all channels, and is used for each channel. The integrative CPU 213 for compiling and aggregating the positional information on all channels examines the computed N correlation maps and selects a correlation map of the most reliable channel.

The reliability of channel is evaluated on the basis of the likelihood of the correlation values. As examples of this evaluation method, it is known (1) to check if the peak value of the correlation map is higher than a threshold TH1 so that the high-peak channel is decided to have high reliability, (2) to examine how many correlation values exceed a threshold TH2 within each correlation map so that the channel in which only one value exists is decided to have high reliability, and (3) to check if the difference between the peak value and the second correlation value within each correlation map exceeds a threshold TH3 so that the channel in which the difference exceeds the threshold TH3 is decided to have high reliability. The above three evaluation methods can be expressed by the following equations. The first method (1) is given by $$\text{Max}(\text{Cor}(i,j)) > TH1 \quad (1)$$

(where $i = -m \sim +m$, $j = -n \sim +n$)

the second one by $$\text{Num}((\text{Cor}(i,j)) \geq TH2) = 1 \quad (2)$$

(where Num is the number that meets the conditions in parentheses)

and the third one (3) by $$\text{Max}(\text{Cor}(i,j)) - \text{Second}(\text{Cor}(i,j)) \geq TH3 \quad (3)$$

Here, the possible correlation value is in the range of $-1.0 \sim 1.0$, and it is 1.0 when the images completely coincide with each other. Therefore, in order to select only higher-reliability channel, it is desired that the thresholds TH1 and TH2 be selected to be larger than 0.9. The integrative CPU 213 selects one or a plurality of correlation maps, determines a displacement common to all channels according to the selected correlation maps, and uses this common displacement for each channel.

While the above embodiment detects the amounts of displacement from the normalized mutual correlation values and evaluates the reliability by the correlation value, it is possible to compute the amounts of displacement for each channel by summing up the pixel value differences between the images, and to provide an index for the reliability according to the displacement.

According to the invention in which the amounts of displacement between the continuously fed inspected image and reference image are sequentially computed for each particular length, each image is divided into N small regions, and the N small images are processed in parallel to produce information of displacement, of which only reliable ones are consolidated to produce the displacement of the whole image as described in the above embodiment.

The present invention includes another technique in which any ones of the N divided images are selected before the amounts of displacement are computed. This selection method will be described with reference to FIGS. 9 and 10.

Figure 9:
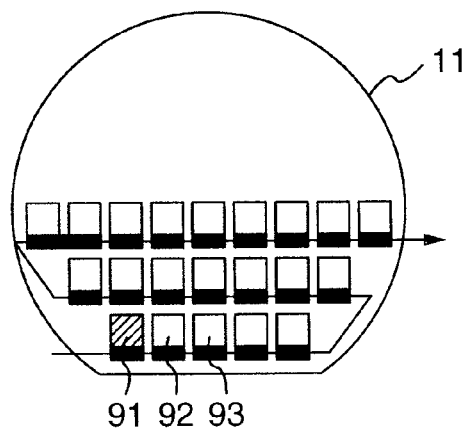
FIG. 9 is a diagram of an example of the head chip on the semiconductor wafer.
Figure 10:
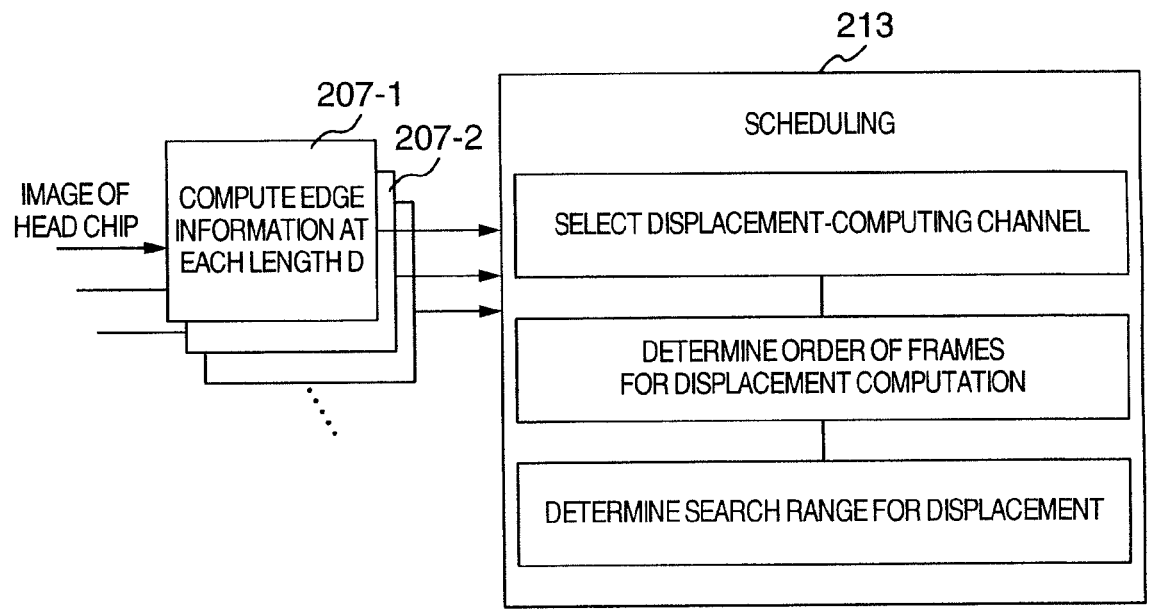
FIG. 10 is a diagram useful for explaining the scheduling processing according to the invention.

In the technique shown in FIGS. 9 and 10, ones of the divided images of which the amounts of displacement are computed are selected by scheduling processing. The other operations than the selection of divided images and computation of the amounts of displacement of the selected divided images are the same as in the above embodiment, and the construction of the pattern inspection apparatus is fundamentally the same as that shown in FIG. 1.

FIG. 9 shows one example of chips of which the images are taken out of the semiconductor wafer as a first step. FIG. 10 is a diagram to which reference is made in explaining the scheduling processing. When the semiconductor wafer has a large number of chips with the same patterns arranged regularly, the image of the first chip, 91 (the chip of which the image is first picked up (hereafter, called the head chip)) is started to take, and after the image of chip 92 has been picked up, the computation of the displacement, comparison of the images, and detection of particle and defects are started. In other words, after the images of the two adjacent chips have been picked up, the displacement-detecting portion 207 starts to compute the amount of displacement of the images. Therefore, when the image of the first chip (chip 91 in FIG. 9) is inputted, or when the amount of displacement is not computed yet, the scheduling for the computation of displacement is previously made, thereby making the later computation efficient.

FIG. 10 is a flowchart for the scheduling processing that the displacement-detecting portion 207 performs when the image of the first chip is entered. Referring to FIG. 10, each of the successive images of the head chip 91 is divided into N regions 5-1~5-N, and these regions are fed to the channels 207-1, 2072, 207n, respectively, as shown in FIG. 5. Each channel 207-1, 207-2, 207-n computes the edge information of the inputted divided image at each constant length D, and transfers the computed edge information to the integrative CPU 213.

The integrative CPU 213 selects 0~N channels for computing the amounts of displacement on the basis of the edge information received from the channels. In addition, since the amounts of displacement are computed at each frame of length D, the CPU determines from which frame the amount of displacement is started to compute, or the order in which the computation is performed.

Moreover, it determines the amount of relative shift between the images as shown in FIG. 6, or the range over which the amounts of displacement are searched. The integrative CPU 213 previously determines the schedule for the displacement computation, and transfers it to each channel. Each channel detects the amount of displacement according to this schedule.

Figure 11:
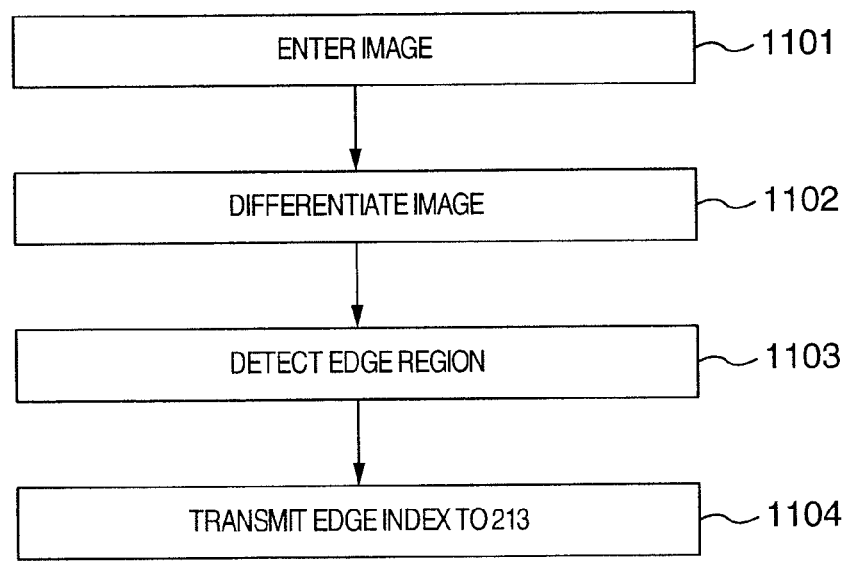
FIG. 11 is a flowchart for the edge information detection according to the invention.

FIG. 11 is a flowchart for the computation of edge information that is made on each channel, or for the procedure of the edge information computation. Referring to FIG. 11, the divided images of the head chip are sequentially entered (step 1101), differential operation is made (step 1102), and edge regions are extracted on the basis of the derivative values (step 1103). Then, the frequency of the edge regions extracted at each constant length, or the index of edge number information necessary for the amounts of displacement is transmitted to the integrative CPU 213 (step 1104). The differential operation in step 1102 can be performed by any kind of operator.

Figure 12:
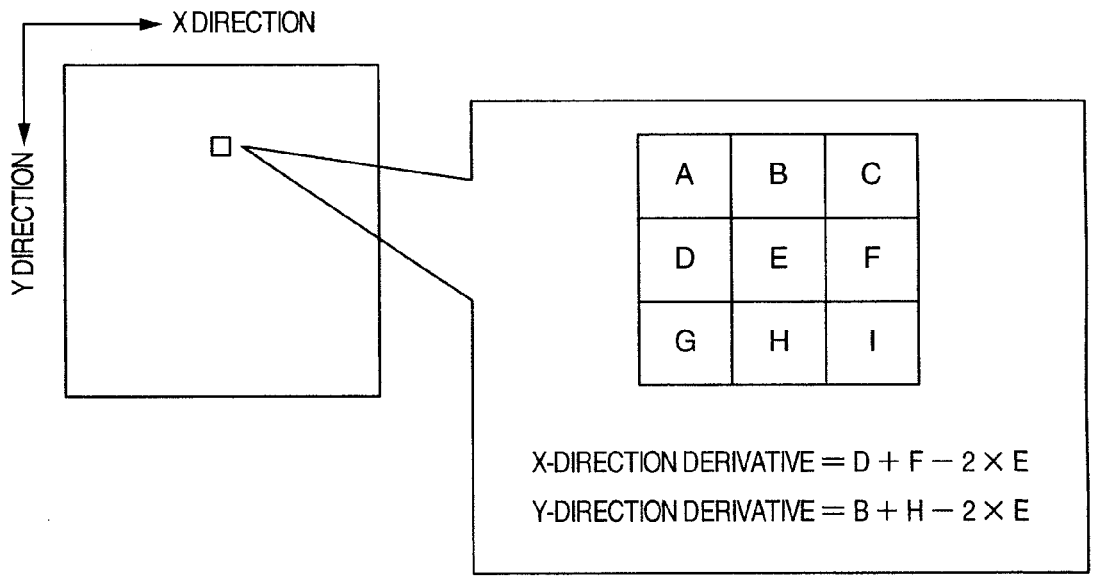
FIG. 12 is a diagram useful for explaining the calculation of derivatives in the edge information detection processing.
Figure 13:
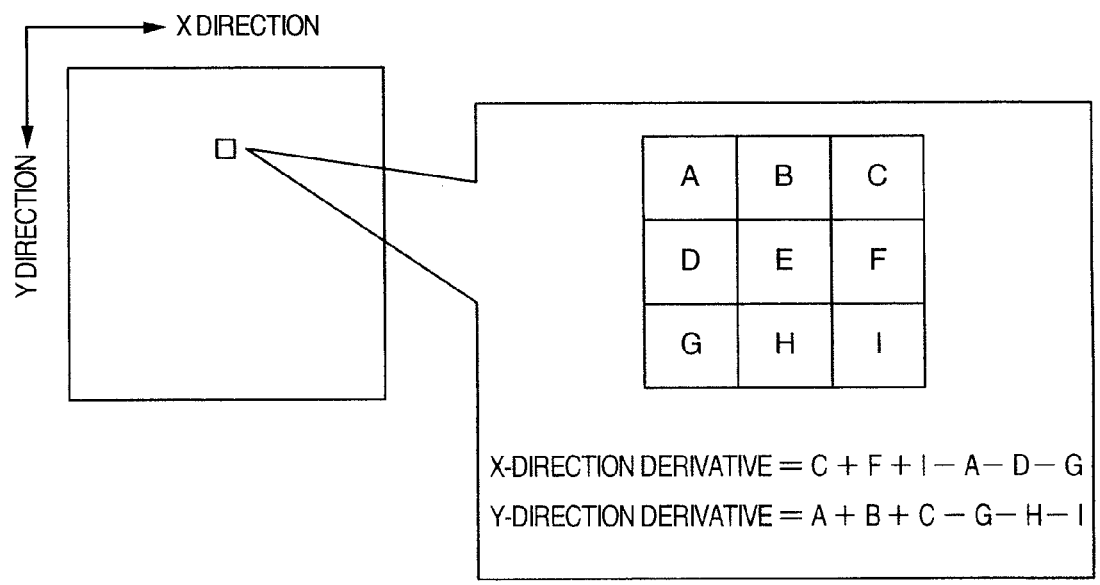
FIG. 13 is a diagram useful for explaining the calculation of derivatives in the edge information detection processing.

FIGS. 12 and 13 show examples of operator for differential operation in step 1102. In the example of FIG. 12, the derivate of the inputted image at each pixel is calculated with respect to the X and Y directions. In other words, computation is made of the derivative at E with respect to X direction=(D+F−2×E) and of the derivative at E with respect to Y direction= (B+H−2×E) by using the neighboring values of target pixel E.

In the example of FIG. 13, computation is made of the derivative at E with respect to X direction=(C+F+I−A−D−G), and of the derivative at E with respect to Y direction=(A+B+ C−G−H−I) by using the neighboring values of target pixel E. Moreover, in order to detect the oblique edges, computation can be made of the derivative 1 at E with respect to oblique direction=(B+C+F−D−G−H), and the derivative 2 at E with respect to oblique direction=(A+B+D−F−H−I) in addition to the derivatives with respect to the X and Y directions. Other kinds of operator and other sizes can be used.

Thus, after the derivatives of each pixel of the image have been computed, the pixels of which the derivatives are higher than a particular threshold THD are extracted as edge regions. In other words, when the derivative of the image at E with respect to X direction is higher than the THD (the derivative at E with respect to X direction≧THD), that pixel is determined as the edge region in the Y direction. When the derivative at E with respect to Y direction is higher than THD (derivative in Y direction≧THD), this pixel is detected as the edge region in the X direction. The number of pixels decided as edge regions is called the edge index. The sum of the derivatives of pixels within a region may be employed as the index.

The integrative CPU 213 (see FIG. 1) receives the above edge index from each channel, and makes the scheduling for the computation of displacement on the basis of the edge index. Since a plurality of matching candidates are computed for the image in which enough edge information is not present in the X and Y directions, or in which fine-pitch patterns are repeated as shown in FIG. 6, the amounts of displacement cannot be uniquely determined. Also, the image having a large number of such patterns causes mismatching in the regions that have edges in the X and Y directions as shown in FIG. 7. Thus, the amounts of displacement are computed by using only the divided images having enough edge information in the X and Y directions.

Figure 14:
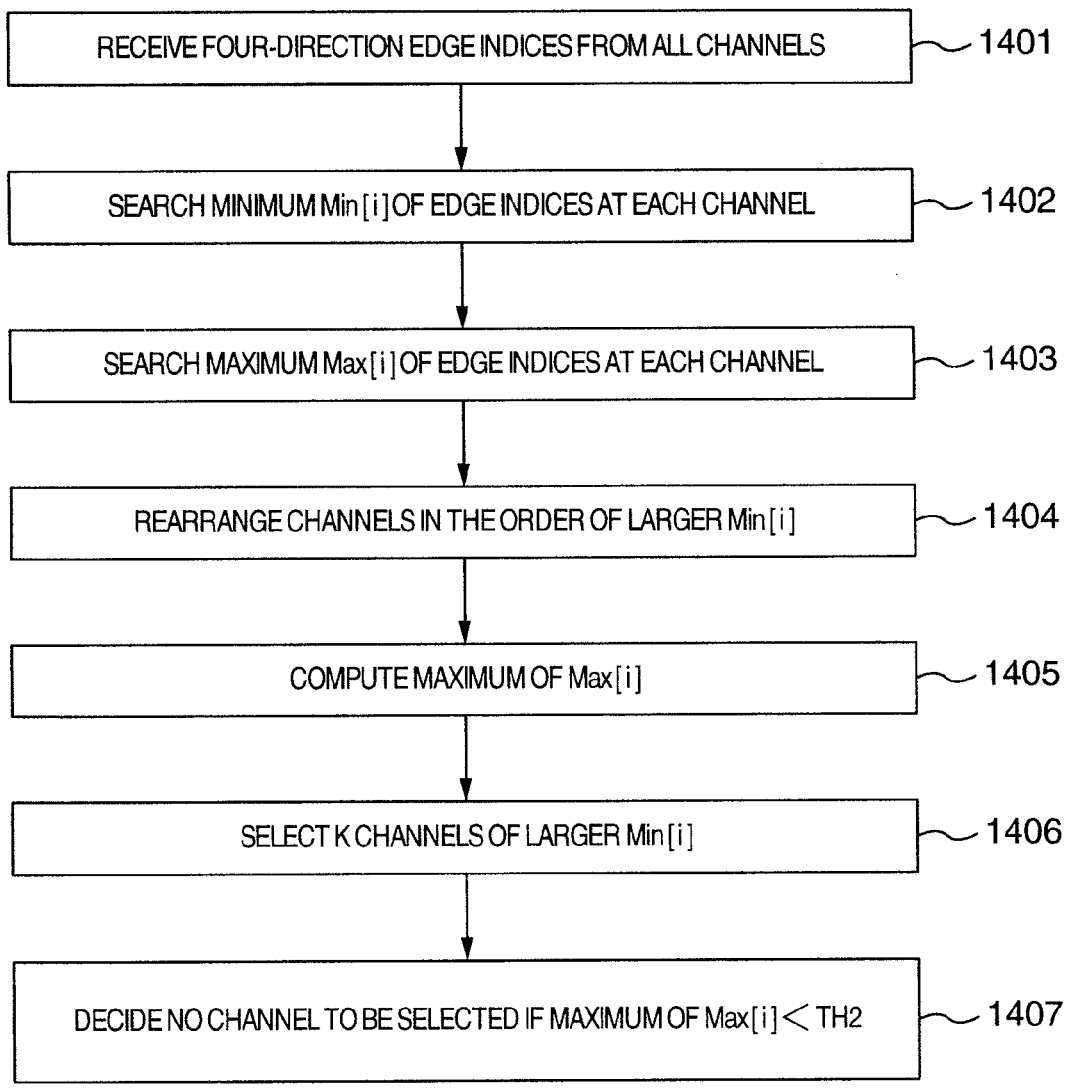
FIG. 14 is a flowchart for displacement operation channel selection in the scheduling processing.

FIG. 14 is a flowchart for selecting the displacement-computing channels in the schedule process with the edge index used as the number of pixels having four-direction edge regions, or for the procedure of the frame-unit processing. Referring to FIG. 14, the four-direction edge index is received from each channel (step 1401), and the minimum value (Min [i]) of the edge indices is determined (step 1402). In other words, $$\text{Min}[i]=\min(A[i], B[i], C[i], D[i])$$

where A, B, C, D: edge index in four directions, i: channel number

Similarly, the maximum value (Max[i]) of edge indices is determined by $$\text{Max}[i]=\max(A[i], B[i], C[i], D[i])$$

(step 1403).

Then, the channels are rearranged in the order of larger ones of computed Min[i] (step 1404), followed by the steps of finding the maximum value of Max[i] of all channels (step 1405), selecting K channels of larger Min[i] as displacement computation channels (step 1406), and deciding that proper pattern information does not exist on all channels if the maximum value of Max[i] is smaller than the predetermined threshold TH2, so that no channel is selected (step 1407).

Figure 15A:
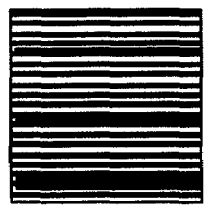
FIGS. 15A-15C are diagrams showing examples of pattern to be used for displacement computation.
Figure 15B:
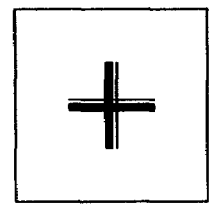
Figure 15C:
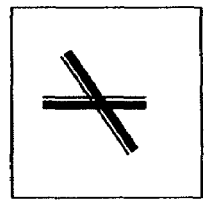

FIGS. 15A-15C are diagrams useful for explaining examples of pattern on which the displacement computation of FIG. 14 is made. The minimum value is selected from the four-direction edge indices because a channel much including both X- and Y-pattern information as in FIGS. 15B and 15C is required to select rather than that much including only X- or Y-pattern information as in FIG. 15A. While K channels having larger ones of Min[i] are selected as in FIG. 14, more severe conditions may be imposed to select channels that meet those conditions. Thus, the displacement computation channels are sorted out so that the patterns that adversely affect the matching can be removed, or that only the pattern suitable for the matching can be used, thereby making it possible to compute the amount of displacement over the whole image. Therefore, even if the image to be inspected has any patterns, the displacement computation can be correctly performed without being affected by those patterns.

Figure 16:
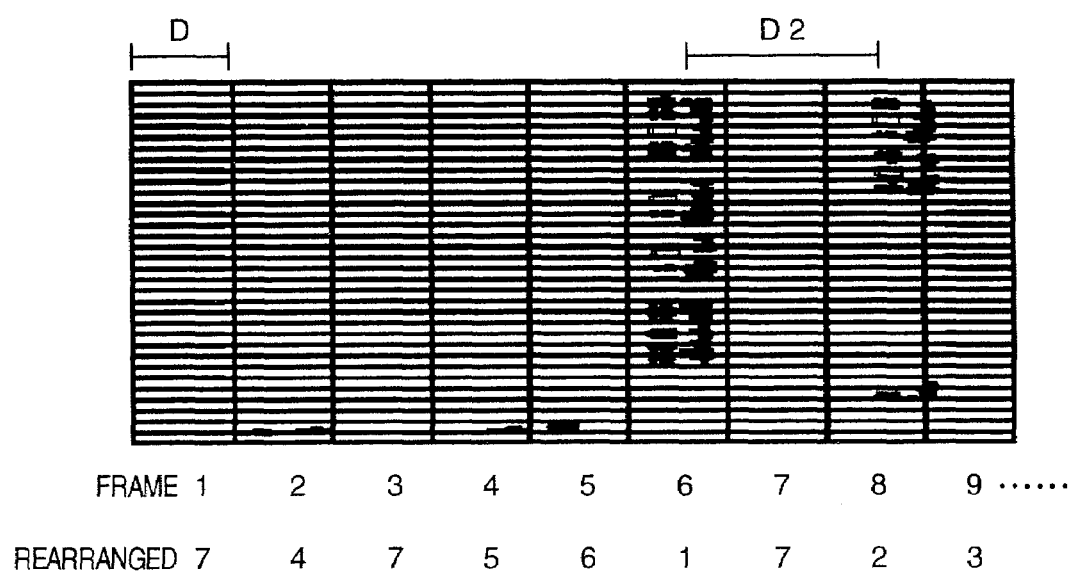
FIG. 16 is a diagram showing an example of images that undergo the scheduling processing.
Figure 17:
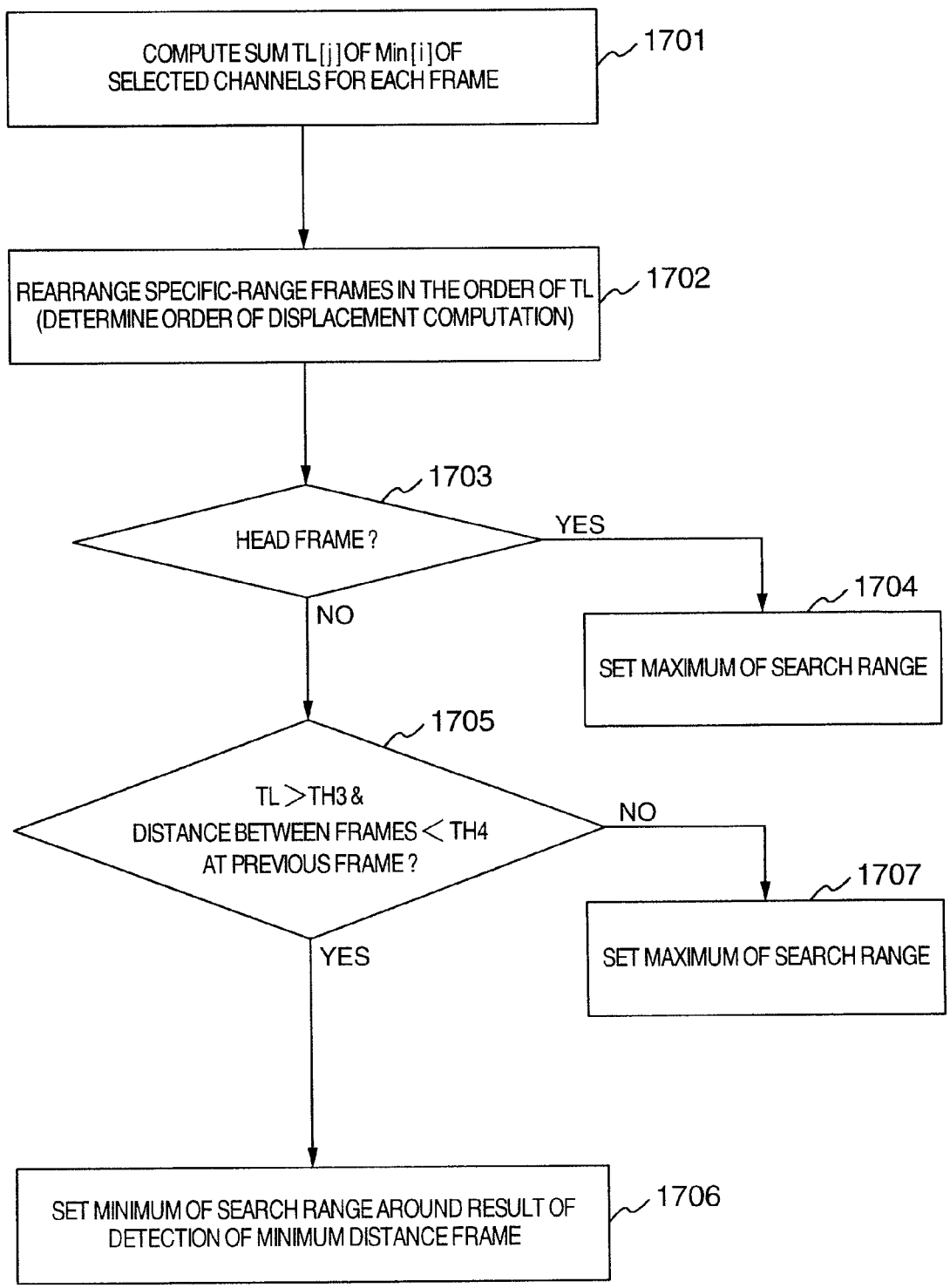
FIG. 17 is a flowchart for determination of frame order and search range in the displacement computation.
Figure 18A:
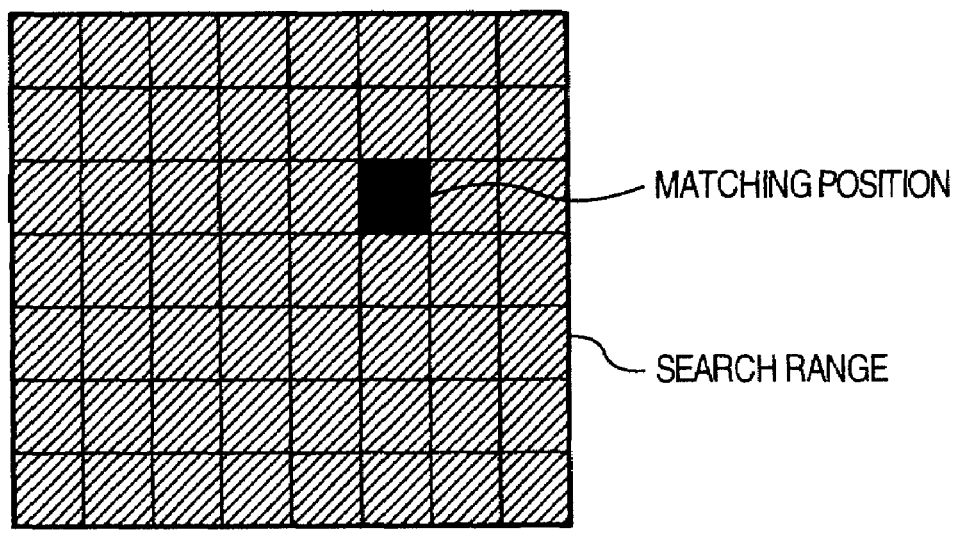
FIGS. 18A-18B are diagrams useful for explaining the search range of image.
Figure 18B:
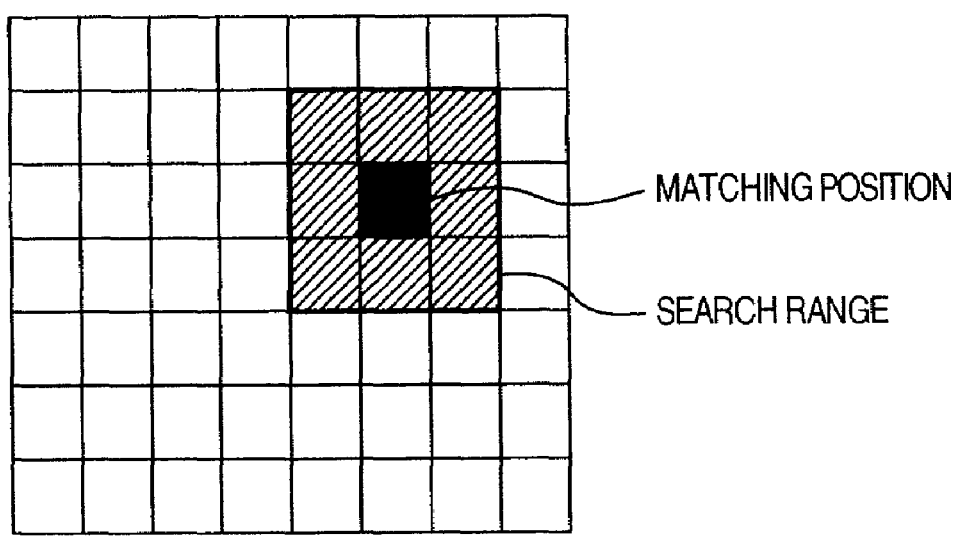

FIG. 16 is a diagram showing an example of the continuous image that undergoes the scheduling processing. FIG. 17 is a flowchart for determining the frame order and search range in the displacement computation. FIGS. 18A-18B are diagrams useful for explaining the search range of image. The scheduling processing determines the rearrangement of frames on which the selected channels compute the amounts of displacement, and the search range of image.

From the image of FIG. 16, it will be seen that the frames 2, 4 and 5 have some patterns having X and Y edges, and that the frames 6, 8 and 9 have many patterns of those edges. The other regions of the image have only the one-direction patterns. The displacement-detecting portion 207 (see FIG. 1) receives images in the order of frames 1, 2, 3 . . . .

The integrative CPU 213 performs the scheduling procedure for the order of the displacement computation on frames and for the displacement search range. An example of the operation will be described with reference to FIG. 17. First, the sum (TL[j]) of the edge indices of the selected channels is calculated for each frame (TL[j]=ΣMin[i], where i is the selected channel, and j is the frame number) (step 1701). Then, the frames are rearranged in the order of larger sum TL (step 1702). The rearrangement may be made within a specific range or over all the range of the head chip. In this embodiment, the frames are rearranged within a range of D×9. The result is the order of frames 6, 8, 9, 2 . . . . The computation on the amount of displacement is performed in this order. In other words, the frame 6 becomes the head frame in the image of FIG. 16.

Then, the search range of each frame is determined. First, the head frame (6 in FIG. 16) on which the displacement computation is first made (step 1703), is set so that the search range of displacement is the maximum (step 1704).

In the second and following frames, the search range of the current frame is set to be narrow if there are neighboring frames (the inter-frame distance <TH4), on which the displacement computation is made before the current frame and which have larger TL than threshold TH3 and the searching is made over the periphery of the matching position that is calculated from the nearest one of the corresponding frames.

If there is no corresponding frame, the search range is set to be wide. Referring to FIG. 16, the search range at the frame 6 is selected to be ±3 pixels in the Y, X direction (FIG. 18A), and at the next frame 8 it is decided if the distance D2 from the frame 6 to the next frame 8 is smaller than a threshold TH4, and if the sum, TL[6] of the edge indices of frame 6 is larger than TH3 (step 1705). If D2<TH4 and TL[6]>TH3, then the search range of frame 8 is determined to be ±1 pixel around the matching position obtained from the frame 6 (FIG. 18B) (step 1706). If the above conditions are not satisfied, the search range of frame 8 is ±3 pixels (step 1707).

If the frames 6 and 8 satisfy the above conditions at the next frame 9, the search range of the frame 9 is determined to be ±1 pixel around the matching position obtained from the frame 8. Thus, the most reliable frame is first processed, and the search range of other frames is determined by use of that information, thereby making the displacement computation be made precisely and with high speed.

In addition, as shown in FIG. 6 at (d), a wide search range is taken over the repeated fine-pitch patterns will sometimes cause a plurality of matching candidates, thus leading to erroneous computation of displacement. Therefore, if a process for detecting such repeated patterns is provided when edge information is computed, a schedule for limiting the search range can be produced even for such frames, thus preventing the displacement computation from being erroneous. Also, the operation according to the flowchart of FIG. 14 does not select the region including only the one-direction pattern information that makes the displacement computation easily erroneous.

The fast processing for the computation of the amount of displacement between images will be described below.

FIGS. 19A-19B and FIGS. 20A-20C are diagrams useful for explaining the scheduling processing.

Figures 19A, 19B:
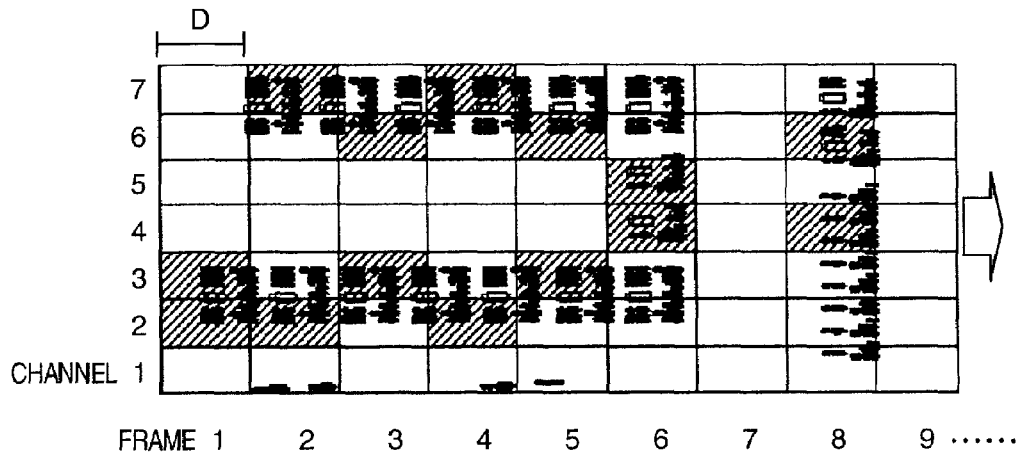
FIGS. 19A-19B are diagrams useful for explaining the images that undergo the scheduling process and the results of the processing.

FIG. 19A shows the images that undergo the scheduling processing, and FIG. 19B shows the results of the scheduling processing. It is assumed that the image to be inspected and the reference image are each divided into channels 1~7 before being entered. When the amounts of displacement for frames 1~9 are computed over all regions as in the prior art, each channel needs to make nine times the search for matching candidates. However, if many patterns having enough edge information are distributed from place to place, the scheduling for the head chip previously disperses the channels for the displacement computation.

The image shown in FIG. 19A undergoes the scheduling so that only the shaded channels can make the computation. The results of scheduling processing in FIG. 19B show the channels ("1") for the displacement computation, the search range of each frame, and the order of frames for the computation. Particularly, the order for the operation is not changed and the search range is not reduced. The maximum number of frames for which each channel makes the displacement computation is three frames (channel 2, 3, 6) out of nine frames. Therefore, the computation time is about ⅓ that of the prior art, and thus fast processing can be expected.

FIGS. 20A-20C show an example of rearrangement of frames and reduction of search range in the case of FIGS. 9A-9B in order to further increase the processing speed. In the example of FIGS. 20A-20C, each time the matching candidates of one frame is computed within each channel, the results are transferred to the integrative CPU 213. The integrative CPU 213 responds to the received matching candidates to transmit the search range and search start position of the next frame to the computing channels.

According to the above-mentioned schedule, each channel computes the amount of displacement for each frame, and the integrative CPU 213 receives the matching information to determine the amount of displacement common to all channels. The common amount of displacement can be produced from a plurality of matching information by use of a method in which the statistic values from the channels are added to determine the amount of displacement as if they were a continuous image, another method in which a majority decision rule is taken for the matching candidates fed from the channels or still another method in which the correlation maps from the channels are added.

The matching information includes various kinds of information, and there are various different methods for integrating a plurality of such information. Basically, the image is divided into a plurality of regions, and a plurality of matching information obtained from the divided regions are combined to produce the amount of displacement of the whole image.

Figure 21A:
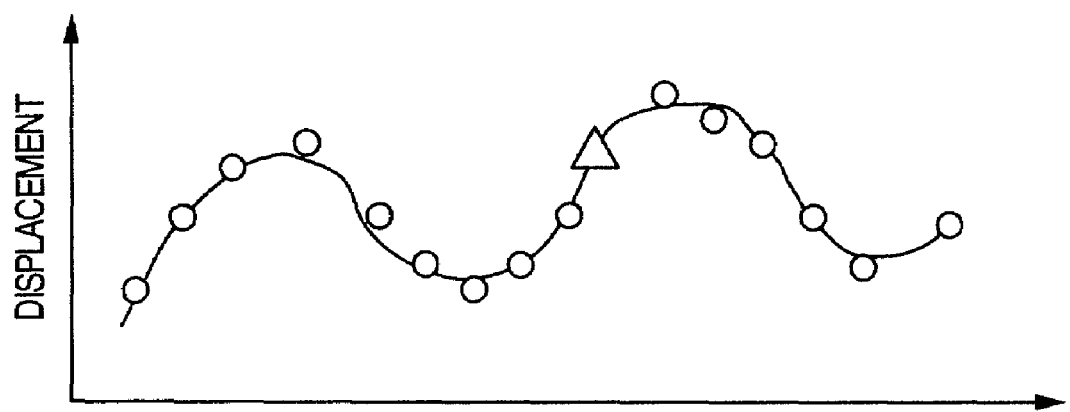
FIGS. 21A-21B are diagrams useful for explaining the displacement from the displacement curves of the previous and following images.
Figure 21B:
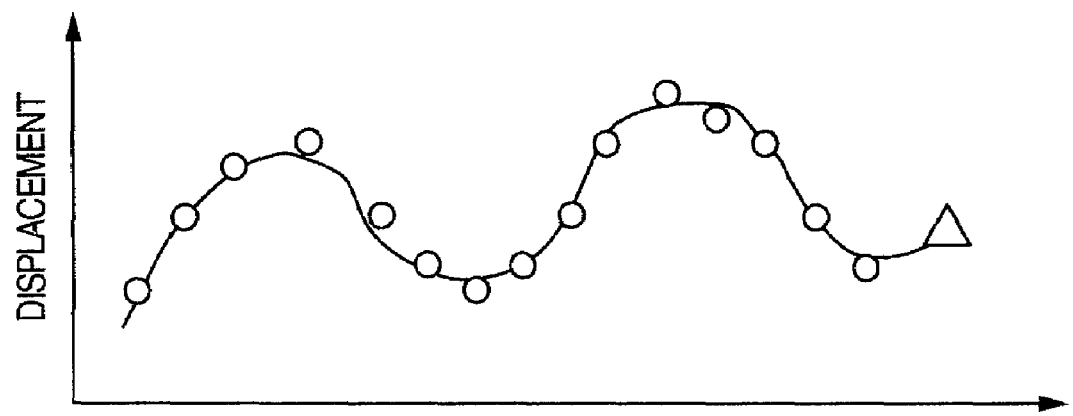

If any channel for computing the amount of displacement is not selected because proper pattern information is not included in any divided image as in FIG. 20A at frame 7, for example the amount of displacement of other frame that includes enough pattern information is used as that of frame 7 or the amount of displacement of frame 7 is predicted by interpolating the amount of displacement of just the previous or following frame (as indicated by Δ in FIG. 21A or it is predicted by extrapolation (as indicated by Δ in FIG. 21B).

The computation time can be greatly reduced as compared with that in the prior art by the scheduling as described with reference to FIGS. 19-21. While two operating channels are selected for each frame as in FIG. 19, the number of channels selected may be further reduced. Thus, the processing time can be reduced to about ¹⁄₁₀ that in the prior art by changing the conditions of the scheduling.

The scheduling is made in parallel with the operation in which the head chip image is picked up before the start of the inspection by comparison. In other words, since it is made during the idle time of the CPU of displacement-detecting portion 207, the processing time for the scheduling is not added to the whole processing time. The scheduling may be made except when the image of the head chip is picked up. In addition, since the schedule shown in FIG. 19 is left as a recipe, the production of another schedule can be omitted provided that the semiconductor wafers to be inspected are of the same kind or type, and run through the same process.

According to the above embodiment, since the pattern regions like (b), (c), (d) of FIG. 6 in which mismatching is caused are removed from the computation regions so that only the reliable pattern region information can be used to produce the amount of displacement, the computation of displacement can be made without dependence on the density and shape of patterns. Thus, the displacement can be detected with high accuracy. The error occurring when the amount of displacement is computed can be reduced to 0.1% or below. The sensitivity of defect detection in bright field inspection apparatus can be improved to be about 100 nm.

If the picture quality is better, this detection sensitivity can be further improved up to about 30~70 nm. When the image is continuously entered, the regions of the image are processed for the displacement computation in the order of having more pattern information, thereby making the erroneous detection nuisance defect be reduced and the displacement computation precise.

When the first chip image is picked up, only the regions having patters at a high density, or having pattern information suitable for the displacement operation are selected as the regions for the displacement computation, thereby making it possible to greatly reduce alignment time and to considerably increase the pattern inspection speed. In addition, since the displacement computation can be performed with high speed without addition and expansion of hardware, the higher speed apparatus can be small-sized and produced at low cost.

While this embodiment employs the semiconductor wafer as an object to be inspected, the present invention may use other objects to be inspected, for example, TFT circuit boards photo masks and printed circuit boards of which the particles and defects can be detected by comparison of images. Moreover, the present invention can be applied to all other pattern inspection operations using means of image comparison than the optical pattern inspection, for example, electron beam pattern inspection and defect inspection using DUV (Deep Ultra Violet) illumination.

In addition, while the construction of the above embodiment shown in FIG. 1 has the integrative CPU 213 provided separately from the general controller 16, the CPU 213 may be provided as a part of the general controller 16. Also, while each of the image to be inspected and the reference image is divided into a plurality of regions by the image sensor 204, the pre-processor 205 may be used to make this division.

The pattern inspection technique according to the invention can reduce the amount of displacement computation, and make high-precision, high-speed detection of displacement. The foreign materials and pattern defects can be detected with high sensitivity and with high speed. The apparatus can be suppressed from being costly and large-sized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pattern inspection method comprising:
sequentially imaging plural chips formed on a substrate;
selecting at least one of pattern sections of each inspection image obtained by the imaging, which are suitable for calculating position gap between an inspection image of a subject chip and a reference image stored in a memory, while discarding other pattern sections which are not suitable for calculating position gap;
calculating position gap between an inspection image of a chip obtained by the imaging and the reference image stored in the memory by using positional information of pattern images included in the inspection image and reference pattern images included in the reference image which are both corresponding to the at least one of pattern sections selected at the selecting;
aligning the inspection image and the reference image by using information of the calculated position gap; and
comparing the aligned inspection image with the reference image, and extracting a difference between the two images as a defect candidate,
wherein in the selecting, the at least one of pattern sections which are suitable for calculating position gap and the other pattern sections which are not suitable for calculating position gap, are determined before firstly starting the calculating of position gap.

2. A pattern inspection method according to claim 1, wherein in the selecting, the at least one of pattern sections are selected from plural pattern sections formed in the firstly imaged chip, using edge information of each pattern section included in the firstly imaged chip.

3. A pattern inspection method according to claim 1, wherein in the selecting, the at least one of pattern sections are selected from a region where plural pattern sections are formed in the firstly imaged chip.

4. A pattern inspection method according to claim 3, wherein in the selecting, the at least one of pattern sections are selected from plural pattern sections formed in the firstly imaged chip, using edge information of each pattern section included in the firstly imaged chip.

5. A pattern inspection apparatus comprising:
an image acquisition unit which sequentially detects images of a manufactured product on which plural chips are formed;
a pattern selecting unit for selecting at least one of pattern sections of each inspection image obtained by the image acquisition unit, which are suitable for calculating position gap between an inspection image of a subject chip detected by the image acquisition unit and a reference image stored in a memory, while discarding other pattern sections which are not suitable for calculating position gap;
a calculating unit for calculating position gap between an inspection image of a chip formed on the substrate and the reference image stored in the memory, by comparing an image of a pattern section included in each images which are corresponding to the at least one of pattern sections selected by the pattern selecting unit;
an aligning unit for aligning the inspection image and the reference image by using information of the calculated position gap; and
a defect candidate extracting unit which compares the aligned inspection image with the reference image, and extracting a difference between the inspection image and the reference as a defect candidate,
wherein the at least one of pattern sections which are suitable for calculating position gap and the other pattern sections which are not suitable for calculating position gap, are determined before firstly starting the calculating of position gap.

6. A pattern inspection apparatus according to claim 5, wherein the pattern selecting unit selects the at least one of pattern sections among plural pattern sections formed in a firstly imaged chip, using edge information of each pattern section included in the firstly imaged chip.

7. A pattern inspection apparatus according to claim 5, wherein the pattern selecting unit selects the at least one of pattern sections from a region where plural pattern sections are formed in a firstly imaged chip.

8. A pattern inspection apparatus according to the claim 7, wherein the pattern selecting unit selects the at least one of pattern sections among plural pattern sections formed in the firstly imaged chip, using edge information of each pattern section included in the firstly imaged chip.

9. A pattern inspection method comprising:
sequentially imaging plural products formed on a substrate;
selecting at least one of pattern sections of each inspection image obtained by the imaging, which are suitable for calculating position gap between an inspection image of a subject product and a reference image stored in a memory, while discarding other pattern sections which are not suitable for calculating position gap;
calculating position gap between an inspection image of a product obtained by the imaging and the reference image stored in the memory by using positional information of pattern images included in the inspection image and reference pattern images included in the reference image which are both corresponding to the at least one of pattern sections selected at the selecting;
aligning the inspection image and the reference image by using information of the calculated position gap; and
comparing the aligned inspection image with the reference image, and extracting a difference between the two images as a defect candidate,
wherein in the selecting, the at least one of pattern sections which are suitable for calculating position gap and the other pattern sections which are not suitable for calculating position gap, are determined before firstly starting the calculating of position gap.

10. A pattern inspection method according to claim 9, wherein in the selecting, the at least one of pattern sections are selected from plural pattern sections formed in a selected imaged product of interest, using edge information of each pattern section included in the selected imaged product.

11. A pattern inspection method according to claim 9, wherein in the selecting, the at least one of pattern sections are selected from a region where plural pattern sections are formed in a selected imaged product of interest.

12. A pattern inspection method according to claim 11, wherein in the selecting, the at least one of pattern sections are selected from plural pattern sections formed in the selected imaged product, using edge information of each pattern section included in the selected imaged product.

13. A pattern inspection apparatus comprising:
- an image acquisition unit which sequentially detects images of a manufactured substrate on which plural products are formed;
- a pattern selecting unit for selecting at least one of pattern sections of each inspection image obtained by the image acquisition unit, which are suitable for calculating position gap between an inspection image of a subject product detected by the image acquisition unit and a reference image stored in a memory, while discarding other pattern sections which are not suitable for calculating position gap;
- a calculating unit for calculating position gap between an inspection image of a product formed on the substrate and the reference image stored in the memory, by comparing an image of a pattern section included in each images which are corresponding to the at least one of pattern sections selected by the pattern selecting unit;
- an aligning unit for aligning the inspection image and the reference image by using information of the calculated position gap; and
- a defect candidate extracting unit which compares the aligned inspection image with the reference image, and extracting a difference between the inspection image and the reference as a defect candidate,
- wherein the at least one of pattern sections which are suitable for calculating position gap and the other pattern sections which are not suitable for calculating position gap, are determined before firstly starting the calculating of position gap.

14. A pattern inspection apparatus according to claim 13, wherein the pattern selecting unit selects the at least one of pattern sections among plural pattern sections formed in a selected imaged product, using edge information of each pattern section included in the selected imaged product.

15. A pattern inspection apparatus according to claim 13, wherein the pattern selecting unit selects the at least one of pattern sections from a region where plural pattern sections are formed in a selected imaged product.

16. A pattern inspection apparatus according to the claim 15, wherein the pattern selecting unit selects the at least one of pattern sections among plural pattern sections formed in the selected imaged product, using edge information of each pattern section included in the selected imaged product.

* * * * *